(12) United States Patent
Von Braun et al.

(10) Patent No.: US 11,457,252 B2
(45) Date of Patent: Sep. 27, 2022

(54) METHOD AND SYSTEM FOR TRANSMITTING ALTERNATIVE IMAGE CONTENT OF A PHYSICAL DISPLAY TO DIFFERENT VIEWERS

(71) Applicant: Appario Global Solutions (AGS) AG, Steinhausen (CH)

(72) Inventors: Max Von Braun, Hamburg (DE); Hans-Peter Boll, Schwaan (DE)

(73) Assignee: Appario Global Solutions (AGS) AG, Steinhausen (CH)

( * ) Notice: Subject to any disclaimer, the term of this patent is extended or adjusted under 35 U.S.C. 154(b) by 85 days.

(21) Appl. No.: 16/480,574

(22) PCT Filed: Jan. 29, 2018

(86) PCT No.: PCT/EP2018/052177
§ 371 (c)(1),
(2) Date: Jul. 24, 2019

(87) PCT Pub. No.: WO2018/138366
PCT Pub. Date: Aug. 2, 2018

(65) Prior Publication Data
US 2019/0364309 A1    Nov. 28, 2019

(30) Foreign Application Priority Data

Jan. 27, 2017 (EP) .................................... 17153512
Dec. 8, 2017 (EP) .................................... 17206147
Dec. 22, 2017 (EP) .................................... 17210553

(51) Int. Cl.
*H04N 21/234* (2011.01)
*H04N 21/2365* (2011.01)
(Continued)

(52) U.S. Cl.
CPC ....... *H04N 21/23439* (2013.01); *H04N 5/225* (2013.01); *H04N 7/181* (2013.01);
(Continued)

(58) Field of Classification Search
CPC ......................... H04N 21/234; H04N 21/2552
See application file for complete search history.

(56) References Cited

U.S. PATENT DOCUMENTS 7,633,487 B2 * 12/2009 Azami ........... H04N 21/440236
345/157
9,270,941 B1 * 2/2016 Lavelle .............. H04N 5/23299
(Continued)

FOREIGN PATENT DOCUMENTS

CN      101236717      8/2008
EP      2787741        10/2014
(Continued)

OTHER PUBLICATIONS

International Search Report for PCT Applicaton No. PCT/EP2018/052177, dated Mar. 29, 2018, 4 pages.

*Primary Examiner* — Mushfikh I Alam
(74) *Attorney, Agent, or Firm* — Day Pitney LLP; George N. Chaclas

(57) ABSTRACT

The present invention relates to a method and a system for transmitting alternative image content of a physical display to different viewers, comprising: generating at least two different sets of image data, each set of image data comprising a sequence of individual images; displaying the images of said at least two sets of image data in a time-sliced multiplexed manner on said physical display; generating at least one video stream of a scene which includes said physical display, said video stream consisting of video frames captured synchronously with the displaying of the images of one of said at least two sets of image data on said physical display; and transmitting said video stream to a
(Continued)

sub-set of said viewers, wherein at least one set of image data comprises a sequence of images and inverse images. The present invention also relates to a control interface implementing the claimed method.

20 Claims, 8 Drawing Sheets

(51) Int. Cl.
| | |
|---|---|
| *H04N 21/242* | (2011.01) |
| *H04N 21/2343* | (2011.01) |
| *H04N 21/218* | (2011.01) |
| *H04N 21/414* | (2011.01) |
| *H04N 5/225* | (2006.01) |
| *H04N 7/18* | (2006.01) |
| *H04N 21/44* | (2011.01) |
| *H04N 21/845* | (2011.01) |
| *H04N 21/43* | (2011.01) |

(52) U.S. Cl.
CPC ... *H04N 21/21805* (2013.01); *H04N 21/2365* (2013.01); *H04N 21/242* (2013.01); *H04N 21/41415* (2013.01); *H04N 21/43072* (2020.08); *H04N 21/44016* (2013.01); *H04N 21/8456* (2013.01)

(56) References Cited

U.S. PATENT DOCUMENTS

| | | | |
|---|---|---|---|
| 10,313,607 | B2 | 6/2019 | Vonolfen et al. |
| 2002/0144263 | A1 | 10/2002 | Eldering et al. |
| 2003/0128218 | A1* | 7/2003 | Struyk ............... H04N 21/4405 345/581 |
| 2006/0221067 | A1* | 10/2006 | Kim .................. H04N 21/41415 345/204 |
| 2006/0244839 | A1 | 11/2006 | Glatron et al. |
| 2008/0152016 | A1 | 6/2008 | Nagahara et al. |
| 2009/0102957 | A1* | 4/2009 | Phelan .................... H04N 5/272 348/E5.022 |
| 2010/0079676 | A1* | 4/2010 | Kritt ................... H04N 21/4122 348/E5.051 |
| 2011/0134231 | A1* | 6/2011 | Hulvey ................. H04N 13/341 348/56 |
| 2011/0157389 | A1* | 6/2011 | McClellan ....... H04N 5/232061 348/222.1 |
| 2014/0035636 | A1* | 2/2014 | Toda ...................... H03K 5/135 327/153 |
| 2016/0110151 | A1* | 4/2016 | Isonishi ........... H04N 21/43637 345/2.2 |
| 2017/0054968 | A1* | 2/2017 | Woodman ............ H04N 13/239 |
| 2017/0366287 | A1* | 12/2017 | Zeng .................... H04J 3/0667 |
| 2020/0090703 | A1* | 3/2020 | Tordjman .............. H04N 5/2621 |
| 2020/0213657 | A1* | 7/2020 | Tsukagoshi ...... H04N 21/23614 |
| 2020/0336770 | A1* | 10/2020 | Tsukagoshi .... H04N 21/234381 |
| 2021/0144438 | A1* | 5/2021 | Nezu ................ H04N 21/41415 |

FOREIGN PATENT DOCUMENTS

| | | |
|---|---|---|
| GB | 2305049 | 3/1997 |
| GB | 2305051 | 3/1997 |
| WO | 2005/112476 | 11/2005 |
| WO | 2007/125350 | 11/2007 |
| WO | 2012038009 A1 | 3/2012 |
| WO | 2016/203427 | 12/2016 |

\* cited by examiner

METHOD AND SYSTEM FOR TRANSMITTING ALTERNATIVE IMAGE CONTENT OF A PHYSICAL DISPLAY TO DIFFERENT VIEWERS

CROSS-REFERENCE TO RELATED APPLICATIONS

This application is the U.S. national phase entry under 35 U.S.C. § 371 of International Application No. PCT/EP2018/052177, filed Jan. 29, 2018, entitled METHOD AND SYSTEM FOR TRANSMITTING ALTERNATIVE IMAGE CONTENT OF A PHYSICAL DISPLAY TO DIFFERENT VIEWERS, which in turn claims priority to and benefit of European Application No. 17153512.3, filed Jan. 27, 2017, European Application No. 17210553.8, filed Dec. 22, 2017 and European Application No. 17206147.5, filed Dec. 8, 2017 each of which is incorporated herein by reference in their entirety for all purposes.

The present invention concerns a method and a system for transmitting alternative image content of a physical display to different viewers.

Active displays, such as Light-Emitting Diode (LED) displays are widely used as billboards or signboards to convey information or advertisements to viewers. Typically, such displays are used in sports or entertainment events. Consequently, such displays often appear in television broadcasts (TV) or video streams which are directed to a large variety of different viewers, a typical example being viewers in different countries with different native languages or different cultural backgrounds. In order to target information/advertisements shown on these displays to specific sub-sets of these viewers, methods have already been developed to vary the content of a display between viewers observing the display via a television broadcast or a video stream. For instance, US patent application US 2002/0144263 describes a method and an apparatus for grouping targeted advertisements on an advertisement channel.

A more elegant approach is to insert the advertisement as an integral part of the video sequence, e.g., displaying the advertisement on a billboard shown in the video sequence. GB 2305051 describes an apparatus for an automatic electronic replacement of a billboard in a video image. Similarly, GB 2305049 describes an electronic billboard replacement system for use in a television broadcast system. However, in order to create a good impression and maintain a natural look of the composed image, the advertisement needs to be adapted to the rest of the scene in the video sequence. Typically, this approach requires human intervention to obtain results of good quality. Generally, these electronic or software-based approaches are often not satisfactory as far as viewer experience is concerned, especially when broadcast schemes involve dynamic scenes partially obscuring the billboard.

In international patent application WO 2005/112476, a method has been described which allows variation of the content of a display between viewers in a television broadcast. This prior art document describes a method that enables multiple viewers to view one of several video streams simultaneously displayed on a single video display. However, the viewers are required to use shutter viewing glasses synchronized to one of the video streams shown on the display. Such a system is not suitable for television broadcasts of the display itself.

These problems are mitigated by a solution described in International Patent Application WO 2007/125350. This prior art document describes a method and a device for varying the content of a physical display which appears as part of a scene in a television broadcast between different viewers of the television broadcast. The display content comprises direct viewer display images directed to the viewers present at the event, for instance a sports event, and a broadcast viewer display images directed to the television viewers. The physical display displays two or more temporarily interleaved data content instances wherein the display image for the broadcast viewer is synchronized to show one of said data content instances. A camera is used to record a scene of the event including the physical display such as a signboard and a control system is used to synchronize the camera and the signboard. The video stream recorded by the camera which comprises all different data content instances is fed to a de-multiplexer which generates individual feeds corresponding to specific data content instances shown on the physical display. The method and system described in WO 2007/125350 requires dedicated camera technology which allows recording at frame rates which are much higher than the usual frame rate used for television or video broadcasts because the camera is required to capture each image displayed on the signboard. Also, the computing power of the de-multiplexer which generates the individual video feeds has to be correspondingly high. Thus, the method described in WO 2007/125350 requires new dedicated equipment and the corresponding costs for establishing such a technology at sports and entertainment events are high Moreover, with the method of WO 2007/125350, the viewing experience of the direct viewers of an event is reduced because the insertion of dedicated images for the broadcast viewers results in an unsteady flickering of the signboard, even when the time intervals during which an image is shown, are too short for the viewer to consciously perceive an image content.

It has therefore been a technical problem of the present invention to provide a method and a system for transmitting alternative image content of a physical display to different viewers which can be based on existing camera and display technology thus allowing the method of the invention to be readily and cost-effectively deployed in many sports and event arenas around the world. Moreover, the method of the invention shall improve the user experience for the direct viewers of an event as well.

This technical problem is solved by the method of claim 1. Preferred embodiments of the method of the invention are subject of the dependent claims.

Accordingly, the present invention is directed to a method for transmitting alternative image content of a physical display to different viewers, comprising:

generating at least two different sets of image data, each set of image data comprising a sequence of individual images;

displaying the images of said at least two sets of image data in a time-sliced multiplexed manner on said physical display;

generating at least one video stream of a scene which includes said physical display, said video stream consisting of video frames captured synchronously with the displaying of the images of one of said at least two sets of image data on said physical display; and transmitting said video stream to a sub-set of said viewers, wherein at least one set of image data comprises a sequence of images and inverse images.

The method of the present invention is of particular advantage if one of the at least two different sets of image data shown on the physical display is intended to be viewed directly by a sub-set of viewers, e.g. visitors that are actually present in a sports stadium (direct viewers) while additional sets of image data are intended to be viewed as video streams by one or more different sub-sets of viewers (broadcast viewers). Thus, the at least two sets of different image data which comprise a set of image data to be viewed by one sub-set of users directly on said physical display (direct viewers). It is noted that, as a matter of course, all image data shown on the physical display will be viewed by the direct viewers because in the present invention, the direct viewers will not employ any shutter glasses or the like which would block any images not intended for the direct viewers. Rather, in the method of the present invention, the frame rates and display periods of the frames of the different sets of image data are selected such that the direct viewer can perceive the set of images intended for the direct viewer in accordance with the physiological constraints of the human eye while other sub-sets of images intended to be transmitted via said video stream to be perceived by broadcast viewers only have frame rates and image display periods selected such that they are not perceived by the human eye when looking directly onto the physical display while a video camera is still able to capture said images.

In the prior art method described in WO 2007/125350, even if the direct viewer is not able to consciously perceive the images intended for video stream transmission only on the physical display, these images will still generate intensity and/or color fluctuations on the physical display which can still interfere with the presentation of images for the direct viewer thus disturbing the experience for the direct viewer.

In contrast with prior art, in accordance with the present invention, it is suggested that at least one set of image data of said at least two sets of different image data, comprises a sequence of images and inverse images. The images of said set of image data comprising images and inverse images are intended to be transmitted via a video stream to a sub-set of viewers, i.e. for the broadcast viewers and should not be consciously by perceived by the direct viewers. The inverse images of said set of image data are not captured when generating the video stream but are displayed on the physical display shortly before or after the corresponding image, which is captured to generate the video stream. The time period between displaying an image to be captured and a corresponding inverse image should be short enough so that the images cannot be resolved by the human eye of the direct viewers of the physical display. Accordingly, the direct viewer perceives an average image of the image intended for the video stream and the corresponding inverse image so that intensity and/or color fluctuations experienced by the direct viewers of the physical display are reduced.

In a preferred embodiment of the present invention, the inverse image of each preceding and/or subsequent image of a set of image data is generated in such a manner that the combined image and inverse image result in a perceived image for the direct viewers having a homogeneous intensity and/or a homogeneous grey value. Accordingly, it is possible that any intensity or color fluctuations for the direct viewers can be further reduced.

In one embodiment, an inverse image is generated for each image, which is intended to be transmitted in a video stream. In this embodiment, the image and the corresponding inverse image are displayed in direct succession on the physical display. In one embodiment, the inverse image is generated on the basis of the corresponding image, for instance by calculating the difference between a maximum intensity value (for instance for each color value RGB) and the corresponding intensity values (RGB) for the image to be transmitted via the video stream ($\text{Imax}_{R,G,B}$ − $\text{Iimage}_{R,G,B}$=$\text{Icomp.image}_{R,G,B}$). If intensities on the physical display (for instance of an LED display) are generated by pulse width modulation (PWM), a perfect inverse or complementary image can be generated because neither the current/intensity-characteristics of the LED's nor the gradation-settings effect the generation of the inverse image. In another embodiment, the calculated inverse image may further be modified by a temporal damping factor to avoid sudden intensity changes between subsequent inverse images.

In one embodiment of the present invention, the inverse image of preceding and/or subsequent images of more than one set of image data is generated such that the combined image of said more than one set of image data and the corresponding inverse image result in a perceived image having a homogeneous intensity and/or a homogeneous grey value. In this embodiment, an inverse image is generated for images of more than one set of image data. Accordingly, less inverse images have to be transmitted and more time slots are available for transmitting images for video streams. The combination of more images can further result in an initial averaging before the effect of the inverse image is applied. However, as the intensities of the images to be combined may also add up, the maximum intensity values to be compensated by the resulting inverse image increase. Accordingly, as in this embodiment, the possible intensities of the inverse images are higher than the intensities of the underlying actual images, the current/intensity characteristics of the LED's should also be taken into account.

In one embodiment of the method of the present invention, the inverse image is generated by including image data from said set of image data to be viewed by said sub-set of users directly on said physical display. Accordingly, the inverse image displayed on the physical display comprises a combination of image data to be viewed by the direct viewer and corrective image data accommodating for the images broadcasted via one or more video streams. In this embodiment, the corrective image data can be displayed as long as the image to be viewed for the direct viewer so that corrective image data can be displayed with lower intensities on the LED display. Still, current/intensity characteristics of the LEDs have to be taken into account.

In one embodiment, the at least one of said at least two sets of different image data can comprise a set of monochromatic image data. Accordingly, the present method can also be employed for software-based solutions (keying technology) where a monochromatic image on a physical display is used to identify the location of the physical display within an environment and to replace the monochromatic image via suitable image processing technology by the content to be viewed by the viewers of the video stream.

In this embodiment, the inverse image can be generated on the basis of the monochromatic image data. Thus, in contrast to conventional keying technologies, where colored flashes are perceived by the direct viewers, the introduction of corresponding inverse images avoids any annoying distraction of the direct viewers.

In one embodiment of the method of the present invention, the set of image data for the direct viewers is presented at a higher frame rate than the set (or each of the sets) of image data for the broadcast viewers. It is known from physiology, that the so-called "flicker fusion threshold" (or flicker fusion rate), the frequency at which an intermittent light stimulus appears to be completely steady to the average human observer, is —amongst other parameters, by the frequency of the modulation, the amplitude or depth of the modulation (i.e., what is the maximum percent decrease in the illumination intensity from its peak value) and the average (or maximum) illumination intensity (Ferry-Porter law). Accordingly, while in the method of the present invention, the image data for the direct viewers are repeatedly interrupted by image data for broadcast viewers, flicker can be reduced when image data for direct viewers are shown at a higher frequency on the physical display. Accordingly, for a given frame rate, each frame of image data for direct viewers can be displayed multiple times on the physical display, for instance, each frame of image data for the direct viewers can be shown in multiple time slots before and/or after each frame of image data for the broadcast viewers.

According to the invention, the at least two different sets of image data which are shown on the physical display can comprise still images or animated images, e.g., a film. When still images are shown on the physical display, the images of one set of image data are essentially identical. When one set of image data comprises a film, the images of one set of image data may differ from each other so that an animated sequence is displayed. Accordingly, in the following description, the terms video stream and television broadcast are used interchangeably and are intended to include a variety of schemes for transmitting image data to viewers, including still images, animated images, video, with or without additional audio data.

According to the present invention, at least one video stream of a scene which includes the physical display is generated, typically by recording the scene with a video camera. The video camera is triggered in such a manner that the video stream consists of video frames captured synchronously with the displaying of the images of one of said at least two sets of image data on the physical display. Thus, in contrast to the method described in document WO 2007/125350, the video camera is not required to capture all images of all sets of image data shown on the physical display but only the images of one of the sets of image data shown on the physical display. Accordingly, the minimum frame rate of the video camera used in the method of the present invention is only as high as the frame rate of one set of image data. Consequently, conventional video cameras known in the art can be employed in the method of the present invention.

In the sense of the present application, a "set of image data" corresponds to the images (be it still images or a film) shown to one particular sub-set of viewers. According to the present invention, at least two sets of image data are shown on the physical display while at least one video stream comprising one set of said two sets of image data is generated. In its most simple form, the method of the present invention comprises one set of image data intended for direct viewers of an event, e.g., viewers actually present at a sports or entertainment event. The second set of image data is directed to viewers of a video stream. More generally spoken, if the sets of image data shown on the physical device include image data for direct viewers, the number of generated video streams corresponds to the number of sets of image data minus one.

In one embodiment of the present invention, a "set of image data" may also include blank images, i.e. time intervals, where no image is displayed on the physical display. This may, for instance, be desired if the direct viewers of an event or participants of an event, such as soccer or basketball players, shall not be distracted by contents shown on the physical display, i.e. by advertisements, which are in this embodiment only transmitted to the broadcast viewers via the video screens.

In another embodiment of the invention, the "set of image data" may comprise monochromatically colored frames which can be used to identify the location of the physical display within a video stream in order to insert desired advertisements in the area of the physical display in the video stream using conventional, software-based keying technologies.

In yet another embodiment of the present invention where no dedicated set of image data for direct viewers is required, the number of video screens corresponds to the number of sets of image data shown on the physical display. Consequently, a video stream is generated for each set of image data displayed on the physical device. While the present invention can be implemented using state of the art video camera technology, a dedicated video camera is used for each video stream. Consequently, a de-multiplexing of a single video stream comprising all image data for all subsets of viewers is not required when implementing the method of the present invention.

According to a preferred embodiment of the method of the present invention, a video stream consisting of video frames captured synchronously with the displaying of the images of one of said at least two sets of image data is accomplished by generating synchronization signals triggering the concurrent displaying of images of said at least one set of image data on said physical device and capturing of video frames of the video stream associated to said set of image data. For instance, a trigger impulse is sent to an image buffer of the physical display triggering the displaying of a specific image of a specific set of image data and a concurrent impulse is sent to a video camera triggering the video camera to capture a video frame of the scene.

In one embodiment of the present invention, the at least one video screen of the scene which includes said physical display is generated by recording a high frame rate video signal of said scene with a single camera unit at a high frame rate, said high frame rate being an integral multiple of a standard frame rate. In conventional professional video broadcast technology, the camera unit is controlled by a camera control unit (CCU) and the video signal from the camera unit is transmitted directly to the CCU. In the context of this embodiment of the present invention, the video signal from the camera is transmitted to an intermediate processing unit arranged between the camera unit and the CCU. The intermediate processing unit comprises at least one connect unit having an input for said high frame rate video signal coming from the camera and a plurality of video outputs, wherein the number of said plurality of video outputs corresponds at least to said integral multiple of the standard frame rate at which the high frame rate video signal is generated. In the intermediate processing unit, the high frame rate video signal can be converted into standard frame rate video signals by cyclically transmitting consecutive frames of said high frame rate input video signal to consecutive video outputs of said integral number of video outputs. Accordingly, each frame of said high frame rate video signal within a time period corresponding to the standard frame rate is transmitted to the same physical video output. It is therefore possible to obtain said at least one video stream at a standard frame rate at one of said integral numbers of video outputs.

The term "standard frame rate" denotes the frame rate at which the one channel, i.e. the video signal from one of the physical video outputs, is transmitted. In one embodiment the standard frame rate corresponds to the frame rate at which the video signal is transmitted to the viewers. In these cases, the standard frame rate typically is either 25 Hz or 50

Hz or 60 Hz (i.e. 25 frames per second, 50 frames per second or 60 frames per second). In another embodiment, the standard frame rate can already be a slow motion frame rate, for instance a frame rate of 150 Hz (150 frames per second) or 180 Hz (180 frames per second). In these embodiments, each of the at least one video stream would already comprise a slow motion video signal. These signals will usually be moderate slow motion signals, for instance 150 Hz which would result in a three times slow motion if replayed at a 50 Hz television screen.

The term "integral multiple" refers to an integer number for deriving the high frame rate from the standard frame rate. This number, i.e. the integral multiple, is preferably comprised between 4 and 32. For instance, if the standard frame rate corresponds to 50 Hz, with an integral multiple of 4, the camera unit would capture the original video signal at a high frame rate of 4×50 Hz=200 Hz. In this example, each four consecutive frames of the high frame rate video signal would cyclically be transmitted consecutively to four different physical video outputs.

In a particularly preferred embodiment of the present invention, the intermediate processing unit is a commercially available baseband process unit.

The commercially available baseband process units have video inputs for receiving a high resolution (e.g. 4K) and/or high frame rate (e.g. 100 Hz, 150 Hz, 200 Hz, 400 Hz, 800 Hz, etc.) input video stream from a camera unit and comprise a video processor for converting the input video stream to more than one 3G-SDI or HD-SDI video streams. Accordingly, the baseband process units comprise a corresponding number of video outputs which are configured as standard 3G-SDI and/or HD-SDI outputs, allowing, for instance, to connect a 4K camera unit to standard SDI equipment of an outside broadcast van or SDI equipment already available in a sports stadium.

In order to comply with the bandwidth requirements of conventional SDI equipment, it has surprisingly been found that commercially available intermediate processing units are typically configured in such a way that consecutive video frames of a 4K high frame rate video signal are transmitted to consecutive physical video outputs of the intermediate processing unit in a cyclic manner. For example, each four frames of a 200 Hz high frame rate video signal recorded during the time interval of a single frame of a 50 Hz standard frame rate video signal are transmitted to four consecutive individual video outputs of the intermediate processing unit. Accordingly, in a preferred embodiment, the baseband process unit comprises at least one 4K high frame rate video input and at least 3G-SDI and/or HD-SDI video outputs.

It has to be noted that the number of outputs can be higher than the above mentioned integral multiple. For instance, the intermediate processing unit can comprise two physical outputs for each video signal, e.g. each frame can be transferred to two video outputs, thus allowing the same video signal to be processed via different video processing pathways.

In certain embodiments, the baseband process unit is arranged between the camera unit and a camera control unit. Usually a professional camera unit is controlled via its dedicated camera control unit (CCU). A HD-camera unit usually has its dedicated HD-CCU, and likewise a 4K-camera unit has its dedicated 4K-CCU. In order to lower costs and inter-operability, camera manufacturers such as Sony Corporation have developed intermediate processing units, denoted "baseband process units" (BPU), which comprise a first connect unit and a second connect unit. The first connect unit is connected to a camera unit having a first resolution in the spatial direction and/or the temporal direction. The second connect unit is connected to a camera control unit having a second resolution in the spatial direction and/or the temporal direction. The intermediate process unit comprises an information bring unit interposed between the first connect unit and the second connect unit. By the information bridge unit, information exchanged between the camera unit and the camera control unit is bridged. For example, the information bridge unit may convert a video signal of the first resolution input to the first connect unit from the camera unit into a video signal of the second resolution and output the signal to the second connect unit. In this case, the information bridge unit may carry out camera signal processing on the video signal of the first resolution before the video signal of the first resolution input to the first connect unit from the camera unit is converted into the video signal of the second resolution. Consequently, it is possible to connect a 4K resolution camera to an HD-camera control unit.

A typical intermediate processing unit is described in U.S. Pat. No. 9,413,923 B2. Such intermediate processing units are, for instance, commercialized by Sony Corporation, for instance as baseband process units BPU 4000 or BPU 4800.

Essentially, these Sony devices allow operating 4K camera units with HD camera control units and transmitting high frame rate 4K signals via SDI outputs. As SDI channels would not meet the bandwidth requirements of high frame rate 4K signals, the BPU's allow combining several SDI outputs in the above described manner in order to transmit high frame rate 4K.

Other companies provide similar equipment. For instance, the XCU UXF/XF fiber base stations commercialized by Grass Valley, Montreal, Canada, can be used in the process of the present invention as well.

Accordingly, the present invention is also directed to the use of an intermediate processing unit, such as a 4K baseband process unit, comprising at least a first connect unit having an input for a high resolution and/or high frame rate video signal from a camera unit, a video processor for converting the high resolution and/or high frame rate input video signal to more than one, for instance four or more, 3G-SDI or HD-SDI video streams, and at least two 3G-SDI and/or HD-SDI video outputs, in the above described method.

Preferably, intermediate processing unit further comprises at least a second connect unit for connecting a camera control unit, for instance a HD camera control unit.

Preferably, the intermediate process unit comprises at least 8 and particularly preferred at least 16 3G-SDI and/or HD-SDI video outputs. In any case, the number of video outputs is greater or equal to the integral multiple which relates the standard frame rate to the high frame rate camera unit.

Particularly preferred, the intermediate processing unit is a Sony 4K baseband process unit such as Sony BPU 4000 or Sony BPU 4800 or a Grass Valley fiber base station, such as a XCU UXF/XF fiber base station.

In one embodiment of the present invention, at least two video streams are generated for at least two sets of image data displayed on said physical display.

In another preferred embodiment, a video stream is generated for each set of image data displayed on said physical display.

When more than one video stream is generated, the bandwidth requirements for transmitting these video streams increase substantially, especially if these video streams contain HD, 4K and/or slow motion content. However, in the method of the present invention, the video streams differ only in the content of the physical display recorded in the video stream and any, albeit minor, motion effects in the recorded scene attributed to the fact that corresponding frames in different video streams are recorded with a certain delay in accordance with the frame rate of the high frame rate camera unit employed. Accordingly, it is possible to use conventional video compression techniques such as delta encoding between frames in different output channels or motion compensation techniques allowing to transfer the video signal of one output channel with full video information while only differential data allowing to reconstitute the original channel signal are transmitted for other video channels. The "fully" transmitted video channel itself does not necessarily have to be an uncompressed video signal because conventional compression techniques such as transform encoding can also be applied to this channel in order to reduce the amount of data to be transmitted.

Preferably, the synchronization signals are based on a master clock which corresponds to the frame rate of the video stream, e.g. the above defined standard frame rate. Any conventional frame rate used in video or film production can be employed. For instance, if a 50p video stream (50 full frames per second) is generated, a 50 Hz master clock can be employed.

Conventionally, the master clock signal is fed to the camera units, either directly or via a CCU.

In the embodiment of the present invention where only a single camera unit is used to generate multiple different video outputs, the master clock signal is fed to an interface which receives image data to be displayed on the physical display and which generates trigger signals at a rate which corresponds to the above defined high frame rate at which the camera units records a video signal. The image data are displayed on the physical display in accordance with the trigger signals.

According to another preferred embodiment where a dedicated camera units is used for each video stream, the master clock is used to generate slave clocks dedicated for each individual set of image data. The slave clocks are obtained by shifting the master clock by a specific delay for each video screen. For instance, if n sets of image data are displayed on the physical device, slave clock i(n) is obtained by shifting the master clock with a delay $D_i=(n-1)\cdot\Delta t$. Accordingly, the synchronization signals for the first set of image data correspond to the master clock while the synchronization signals for the subsequent sets of image data are phase-shifted within the periodic time of the master clock. For instance, at a frd shutter time of each camera associated to a particular video screen determines the maximum number of channels (sets of image data) which can be displayed on the physical display and transmitted via dedicated video streams. Accordingly, with a shutter time of $\Delta s$, the maximum number of sets of image data n is determined by the equation $n\cdot\Delta s \leq 1/f$. Similarly, the physical display has to be able to show images at the required frame rate of $n\cdot f$. Commercially available displays as used in sports arenas have frame rates up to 1200 Hz or even 2400 Hz so that at least 24 sets of image data can be presented.

According to one embodiment of the present invention, the first set of image data corresponds to the images presented for the direct viewers. According to this embodiment, the first set of image data is shown within the delay period $\Delta t$ between subsequent synchronization signals for the video streams. In a particularly preferred embodiment of the method of the invention, shutter time $\Delta s$ and delay period $\Delta t$ are selected such that approximately 90 percent of the time within a frame period of the master clock, images of the first set of images directed to the direct viewers are shown $(n\cdot\Delta s \leq 0.1\cdot(n-1)\cdot\Delta t)$.

According to another embodiment of the present invention, at least one set of image data comprises a sequence of real images and inverse or complementary images of the respective real images. According to this preferred embodiment, a real image and the respective inverse image are shown in immediate succession at a frequency which cannot be resolved by the human eye. Accordingly, a direct viewer perceives the sequences of real images and inverse images as a neutral, featureless image. According to the invention, each set of image data intended for the video streams is presented in this manner, i.e. as a sequence of real images and correspondingly inverse/complementary images, while the set of image data intended for the directed viewers is presented as images only. As a viewer present at an event views all images shown on the physical display, the inserted set of images intended for the video streams are less disturbing because the sequence of image and inverse image essentially cancel out.

As the frame rate for recording the video is usually higher than the time resolution of the human eye, e.g. higher than 20 Hz (20 frames per second), it is not necessary to insert an inverse/complementary image after each image presented to the physical display. Therefore, according to another embodiment of the invention, an inverse/complementary image is calculated on the basis of a group of real images which comprises more than one real image. The presentation of the inverse/complementary image is associated with presentation of this group of real images, e.g. it is shown before or after the group of real images are presented or even within the group of real images. In one embodiment, the group of real images comprise all images shown within one time period (1/(frame rate)) of the master clock so that only one inverse/complementary image is shown within each time period.

In accordance with one embodiment, when the display is a color display, the sequence of image and inverse image is established by means of time multiplexing a fundamental image with a color-inverted image thereof, on a pixel by pixel basis, thereby generating a resulting compound image on the display which is substantially featureless to a direct viewer of the display. Each inverse color data component can be generated from, and as a function of, a corresponding color data component of the fundamental image signal, and is therefore representative of the same color component of the fundamental image. Since signal amplitude is directly related to image color intensity, albeit non-linearly, the amplitude of each inverse color data component is determined as a function of the amplitude of its corresponding color data component, such that the time-weighted average of the color intensities corresponding to the amplitudes of all color data components and corresponding inverse color data components is substantially the same for each compound color data component corresponding to the same pixel. The calculated amplitude of each inverse color data component during a given display frame is set such that the intensity of each corresponding color component of the resulting compound image is substantially the same as all other color components. As the fundamental and inverse color data components are time multiplexed at a sufficiently high frequency that the human eye cannot discern there between, the intensities of all color components of the resulting image generated by the compound image signal will appear to be substantially the same for each pixel. As a consequence, there is no visible variation in color or intensity from pixel to pixel, and the resulting compound image appears to be substantially featureless. Thus, by time multiplexing the individual color data components of a fundamental image signal with corresponding inverse color data components, on a pixel by pixel basis, the fundamental image is essentially time multiplexed with a computed color inverted image thereof, to generate a resulting compound image which is substantially neutral and featureless to the naked eye of an observer.

According to a preferred embodiment of this presentation of inverse images, the inverse image of each preceding and/or subsequent image is generated in such a way that the combined image and inverse image result in a perceived image having a homogeneous intensity.

According to a further preferred embodiment of the invention, the physical display is a light-emitting diode (LED) array/display. Preferably, the LED display is a signboard or a billboard.

According to a further embodiment of the invention, the scene which is recorded in one or more video streams, is part of a sports event or an entertainment event.

The present invention further concerns a control interface configured to carry out the method of the invention, said control interface comprising means for receiving or generating a master clock signal, means for generating two or more time-shifted slave clock signals and means for generating trigger signals in correspondence with said two or more time-shifted slave clock signals.

Preferably, the control interface further comprises at least one input receiving an external master clock signal, at least two slave outputs for transmitting said slave clock signals to one or more, in one embodiment two or more, cameras and at least on trigger outputs for transmitting trigger signals to a physical display for displaying different sets of image data on said physical display in a time-sliced multiplexed manner.

According to one embodiment, the control interface is a dedicated hardware interface, where said means for receiving or generating a master clock signal, means for generating two or more time-shifted slave clock signals and means for generating trigger signals in correspondence with said two or more time-shifted slave clock signals are at least partly hardware-implemented in dedicated micro-controllers or FPGAs.

According to another embodiment, the control interface is completely implemented in software. Accordingly said means for receiving or generating a master clock signal, means for generating two or more time-shifted slave clock signals and means for generating trigger signals in correspondence with said two or more time-shifted slave clock signals are at implemented as an executable program in a general purpose computer or in hardware components (FPGAs, micro-controllers, sending card, graphics cards, etc.).

Finally, the present is directed to a system for transmitting alternative image content of a physical display to different viewers, comprising at least one physical display, a control interface as described above for displaying at least first and second sets of image data on said physical display in a time-sliced multiplexed manner, at least one camera for recoding a scene including said physical display in correspondence with said first set of image data, means for generating at least one video stream from video data provided by said least one camera and transmitting said video stream to a sub-set of said viewers.

In the following, a preferred embodiment of the present invention will be described in more detail making reference to the enclosed drawings. In the drawings, FIG. 1 shows a schematic overview of a system implementing the method of the present invention;

The present invention is now described in more detail with reference to a typical example, namely a television broadcast of a sports event.

Figure 1:
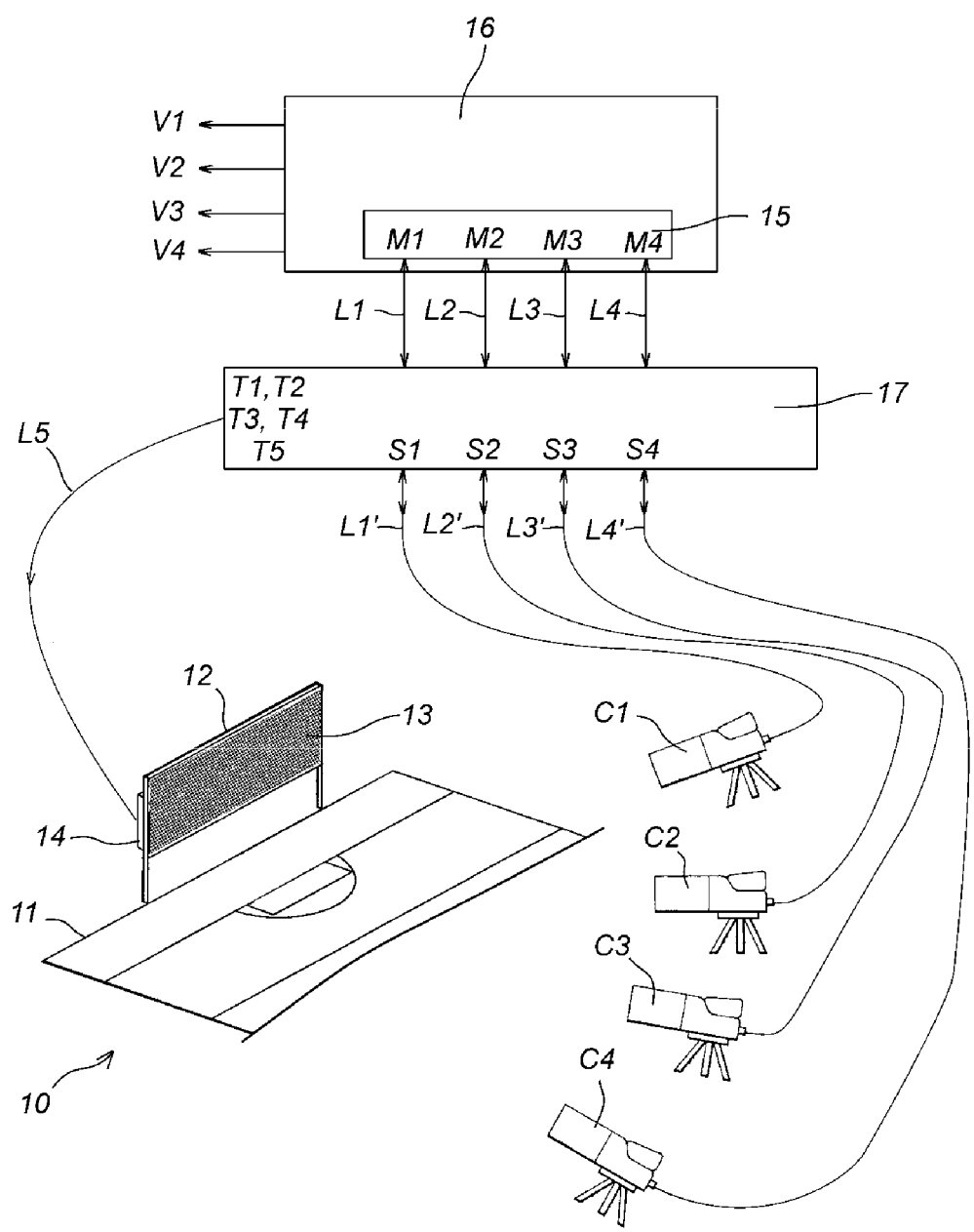

In the embodiment of the present invention depicted in FIG. 1, dedicated camera units are employed for each video stream. Accordingly, a multiplicity of cameras C1, C2, C3, C4 is used to provide video footage of a sports event exemplified by a (partly depicted) soccer playing field 10. At a side line 11 of the playing field 10, an advertisement billboard 12 having an LED display 13 is installed. The advertisement billboard 12 comprises a controller 14 which controls delivery of still and/or animated images to the LED array 13. In a conventional multi-camera broadcasting scheme, cameras C1, C2, C3 and C4 have to be synchronized in order to allow seamless switching from one camera to another. To this effect, cameras C1, C2, C3 and C4 receive a synchronization signal from a master clock 15 which is part of a television control unit, for instance housed in an outside broadcasting unit (OB unit), for instance in an OB van 16. In a conventional TV broadcast, cameras C1, C2, C3 and C4 are synchronized with identical master clock signals M1, M2, M3, M4 (i.e. M1=M2=M3=M4). These synchronization signals can be transmitted to cameras C1, C2, C3, C4 via lines L1, L2, L3 and L4, respectively. As indicated by the arrows, lines L1, L2, L3 and L4 can be bidirectional allowing not only synchronization signals to be transmitted to the cameras C1, C2, C3 and C4, but also video signals from the cameras to be fed to OB van 16. As a matter of course, the bidirectional communication between OB van 16 and cameras C1, C2, C3 and C4 can be wire-based or wireless or a combination of both.

In a conventional TV broadcast, the video feeds of the cameras are usually combined to generate a single video stream delivered to the viewers. In contrast, in the method according to the present invention cameras C1, C2, C3 and C4 are used to generate different video feeds V1, V2, V3, V4 for different sub-sets of viewers, e.g. viewers in different countries. These different video feeds will show essentially the same scene of the event but differ in the information displayed on LED array 13. In order to allow different cameras to record different information displayed on the LED array, the concurrent master clock signals M1, M2, M3 and M4 which are emitted from master clock 15 are not directly fed to the respective cameras C1, C2, C3 and C4. Rather, the concurrent master clock signals are fed to an interface 17, which allows introducing a predetermined time delay (phase shift) between the synchronization signals delivered to the respective cameras. The phase shifted signals are designated as slave clock signals S1, S2, S3 and S4, respectively, which are then transmitted via bidirectional lines L1', L2', L3' and L4' to cameras C1, C2, C3 and C4. In the present case, slave signal S1 corresponds to the master clock signal M1 while signals S2, S3 and S4 are phase-shifted by delays $\Delta t$, $2 \cdot \Delta t$ and $3 \cdot \Delta t$ with respect to the corresponding master clock signals M2, M3 and M4, respectively.

Moreover, concurrently with slave clock signals S1, S2, S3 and S4, interface 17 generates trigger signals T1, T2, T3 and T4 are transmitted via line L5 to the controller 14 of the LED array 13 in order to ensure that images directed to the specific sub-sets of viewers are shown on the LED array 13 of advertisement billboard 12 at the respective (phase-shifted) trigger times of cameras C1, C2, C3 and C4.

In one embodiment of the invention, one of the cameras could be used to show the same set of image data which is intended for the direct viewers present at the event. In this case, the number of sets of image data would correspond to the number of cameras phase-shifted with respect to each other. However, in the example described in the figures, an extra set of image data is presented to the direct viewers. Accordingly, a total of five sets of image data are provided which can be displayed on the LED array 13 at specific times determined by the interface 17 via controller 14. To this effect, interface 17 not only generates trigger signals T1, T2, T3, T4 but also a trigger signal T5 which is used to show the images of the set of image data directed to the direct viewers.

Specifically, there are four sets of image data dedicated to the respective four sub-sets of viewers which can view the sports event receiving dedicated information or advertisements on the LED array 13. Camera C1 generates a video stream V1 for a first sub-set of viewers, while cameras C2, C3 and C4 generate respective video feeds V2, V3 and V4 for the second, third and fourth sub-set of viewers.

The fifth set of image data is used to depict the images which are intended for the direct viewers that are present at the sports event. As described above, in a preferred embodiment of the invention the LED array is controlled in such a manner that most of the time, the images intended for the direct viewers are displayed on the LED array 13.

Figure 2:
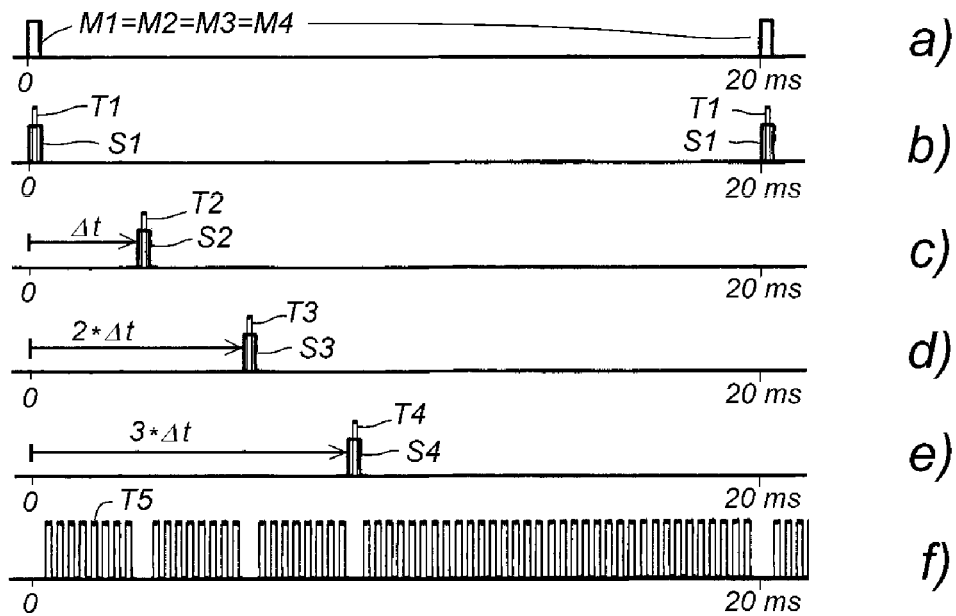
FIG. 2 shows a timeline of the master and slave clocks generated according to a first embodiment of the method of the invention.

FIG. 2 depicts the respective synchronization signals used in the method of the invention. FIG. 2a shows a master clock signal emitted at a rate of 50 Hz, e.g. directed to a 50 frames per second video recording. FIGS. 2b, 2c, 2d and 2e correspond to the slave clock signals S1, S2, S3 and S4 generated by the interface 17. As can be taken from FIG. 2, each slave signal is face-shifted by a delay $n \cdot \Delta t$, with $n=0, 1, 2$ and $3$, respectively. Signals S1, S2, S3 and S4 trigger the shutter times of the respective cameras C1, C2, C3, C4.

While the shutter of a camera is open, LED array 13 shows an image of the respective set of image data as triggered by trigger pulses T1, T2, T3 and T4 respectively.

FIG. 2f depicts the trigger pulses T5 for the fifth sub-set of image data directed to the direct viewers. In the presently described embodiment, these images are only shown on the LED array when no camera is active but in other embodiments the camera(s) can be active as well. As can be taken from FIG. 2, the frame rate of the LED array is much higher than the frame rate of the cameras.

Figure 3:
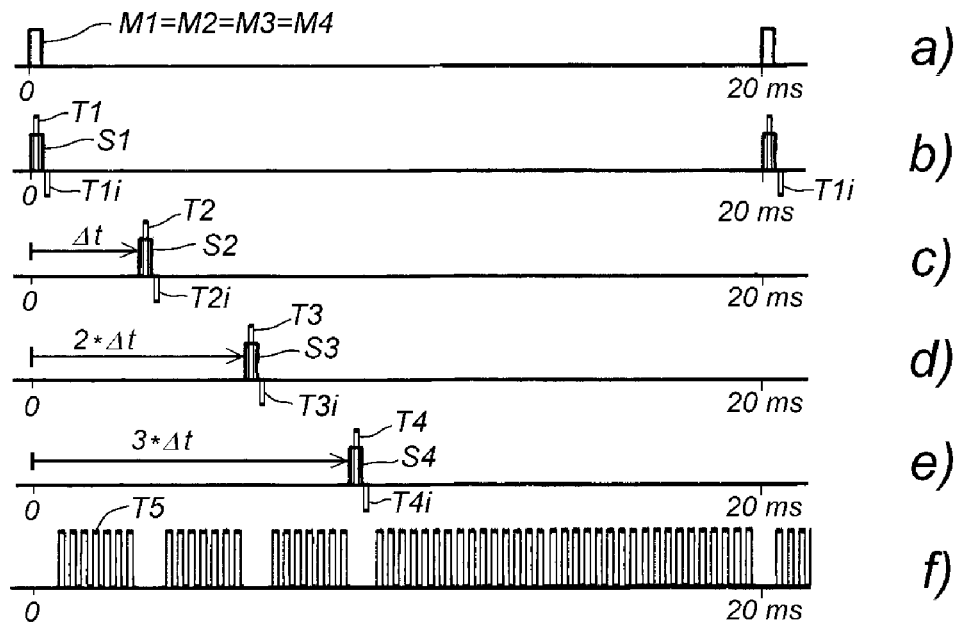
FIG. 3 shows a timeline of the slave clocks generated according to a second embodiment of the method of the invention.

FIG. 3 depicts a variant of the synchronization scheme of FIG. 2, where for each slave clock pulse two LED array trigger pulses are generated. The leading pulses T1, T2, T3 and T4 trigger the actual image to be recorded by the respective camera. Immediately after a video frame has been recorded, i.e. after termination of slave signals S1, S2, S3 and S4, respectively, pulses T1$i$, T2$i$, T3$i$ and T4$i$ are generated triggering the displaying of an inverse image of the respective image shown at T1, T2, T3 and T4. Image and inverse image are shown at a rate which cannot be resolved by the naked eye thus generating a smoother viewing experience for the direct viewers.

It should be noted that in the context of the present invention, each camera C1, C2, C3 and C4 can represent a group of cameras, each camera of the group being triggered by the same synchronization signal. The video stream V1, V2, V3 and V4 generated by each group of cameras can therefore, for example, be comprised of multi-camera feeds, e.g. showing the event from different angles.

Also, the terms synchronization signal, master clock signal, slave clock signal or trigger signal and corresponding inputs and outputs at the control interface are to be construed broadly. These signals can be analog signals, digital signals or a combination of both. These signals can be wire-based or wireless signals. Especially when digital signals are involved, these signals can convey further information in addition to timing/trigger information. For instance, the trigger signals can convey information concerning the displaying of a particular image in a particular set of image data. Also, while cameras C1, C2, C3, C4 have been shown to be connected to the interface via dedicated lines, the slave clock output of the interface can also be a single output, e.g. a single data bus on which digitally addressed slave clock signals S1, S2, S3 and S4 can be transmitted to cameras C1, C2, C3, C4 linked to the data bus.

Figure 4:
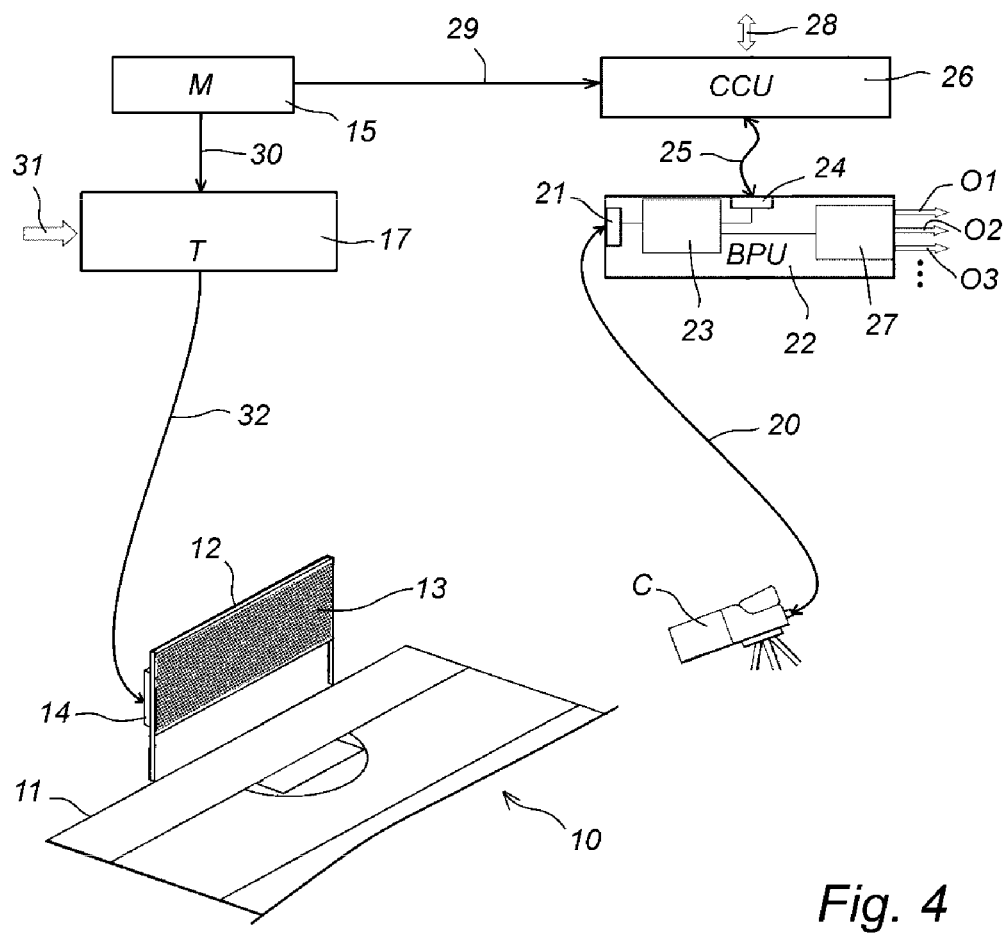
FIG. 4 shows a schematic overview of a system implementing another embodiment of the method of the present invention.
Figure 5:
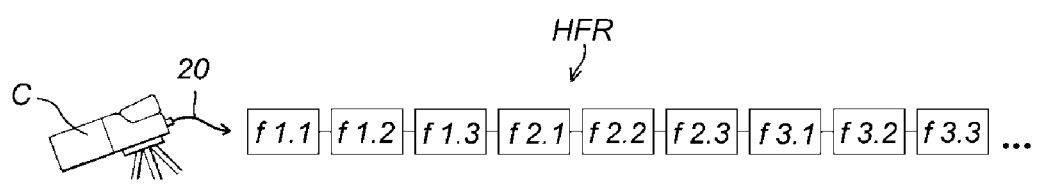
FIG. 5 shows a frame sequence of a single camera unit used in the embodiment of FIG. 4.
Figure 6:
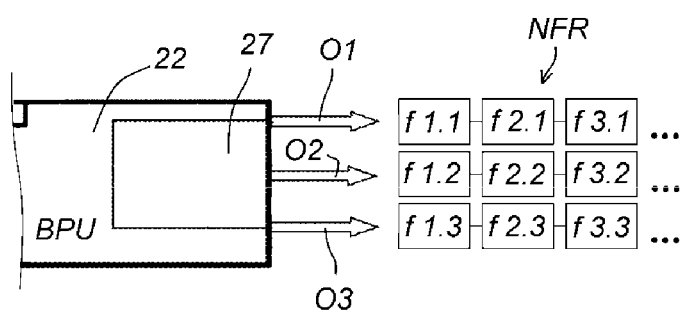
FIG. 6 shows frame sequences of video streams generated from the video stream of FIG. 5

FIG. 4 schematically depicts a further embodiment of the present invention in a similar schematic view as in FIG. 1, except that in this embodiment, a single camera unit C is used to capture an initial high frame rate video stream of a the scene which includes the LED display 13 of an advertisement billboard 12 arranged at a sideline 11 of a soccer playing filed 10. A typical camera unit C which can be employed in the present embodiment is a HDC 4300 camera commercialized by Sony Corporation which allows recording a scene with a high frame rate. The high frame rate video stream HFR (c.f. FIG. 5) is transmitted via a first optical cable 20 to a first connect 21 of an intermediate processing unit 22. The intermediate processing unit 22 comprises an information bridge 23 to connect the first connect 21 to a second connect 24 which can be used to connect the intermediate processing unit 22 via an second optical cable 25 to a camera control unit (CCU) 26. The camera control unit 26 has additional inputs/outputs 28 for signals such as external camera controls, tally, prompter, return video, etc. A suitable intermediate processing unit 22 is, for instance a baseband process unit (BPU), such as the BPU 4000 commercialized by Sony Corporation. The intermediate processing unit 22 further comprises a video processor 27 for converting and routing the initial high frame rate video stream to a plurality of physical SDI outputs O1, O2, O3, etc. The SDI outputs O1, O2, O3, etc. provide normal frame rate video streams NFR (c.f. FIG. 6).

The camera unit C receives a master clock signal M from a master clock 15 either directly (not depicted) or via a line 29 connecting the master clock 15 to the camera control unit 26 and optical cables 25, 20.

The master clock signal M is also fed to an interface 17 via line 30. The interface 17 receives image data via image data input 31 and generates trigger signals T according to which the image data are transmitted via line 32 to the LED display 13 where the image data are shown in accordance with the trigger signals T. The trigger signals T are selected such that subsequent frames recorded by the camera unit can show the recorded scene with different image data shown on the LED display 13. As a matter of course, the image data can also be transmitted pre-stored in a storage medium of the display 13 and/or of the interface 17. Moreover, the interface 17 can be part of the advertisement billboard 12 so that line 32 is part of the internal circuitry of billboard 12.

It should be noted, however, that the camera control unit 26 is not essential for the method of the present invention because the camera unit C can employ its dedicated control unit or even have the necessary controls implemented therein. The main purpose of the intermediate processing unit 22 is to split the frames coming from the high frame rate camera unit C into separate video streams at the SDI outputs O1, O2, O3, etc. of the intermediate processing unit 22, as described in more detail below.

FIG. 5 shows a sequence of frames of a high frame rate video HFR recorded by the camera unit C with three times of a normal frame rate (50 Hz), i.e. with 150 Hz. Accordingly, three frames f i.1, fi.2, f,i.3 are recorded during a time interval of 1/50 sec. (20 ms). FIG. 5 shows the frames recorded during a period of 60 ms, i.e. i=1, 2, 3). The frames are transmitted via the optical cable 20 to the intermediate processing unit 22 (BPU).

As shown in FIG. 6, the video processor 27 of the intermediate processing unit 22 splits the HFR stream into three NFR streams and routes the frames to three different SDI outputs O1, O2, O2 in such a manner that frames (f n.i) are routed to output Oi (i=1, 2, 3) with n being the consecutive frames of the HFR video stream. As can be taken from FIG. 6, the frames 1.1, 2.1, 3.1 etc. of the initial high frame rate video screen generate a first normal (standard) frame rate video stream NFR at a frame rate of 50 Hz at SDI output O1. Similar NFR video streams are generated at outputs O2, O3. Accordingly, the bandwidth requirements of the initial HFR video stream is distributed to three NFR video streams at the three SDI outputs O1, O2, O3. In a conventional broadcasting scheme, the three streams will be combined again after transmission via standard SDI transmission lines. In the context of the present invention, however, the LED display of the billboard is triggered such that different content is shown on the display when frames n.1, n.2 and n.3 (n=1, 2, 3, 4, 5, . . . ) are recorded, respectively. Thus, the NFR streams generated at different SDI outputs are used as different video streams for different audiences.

Figure 7:
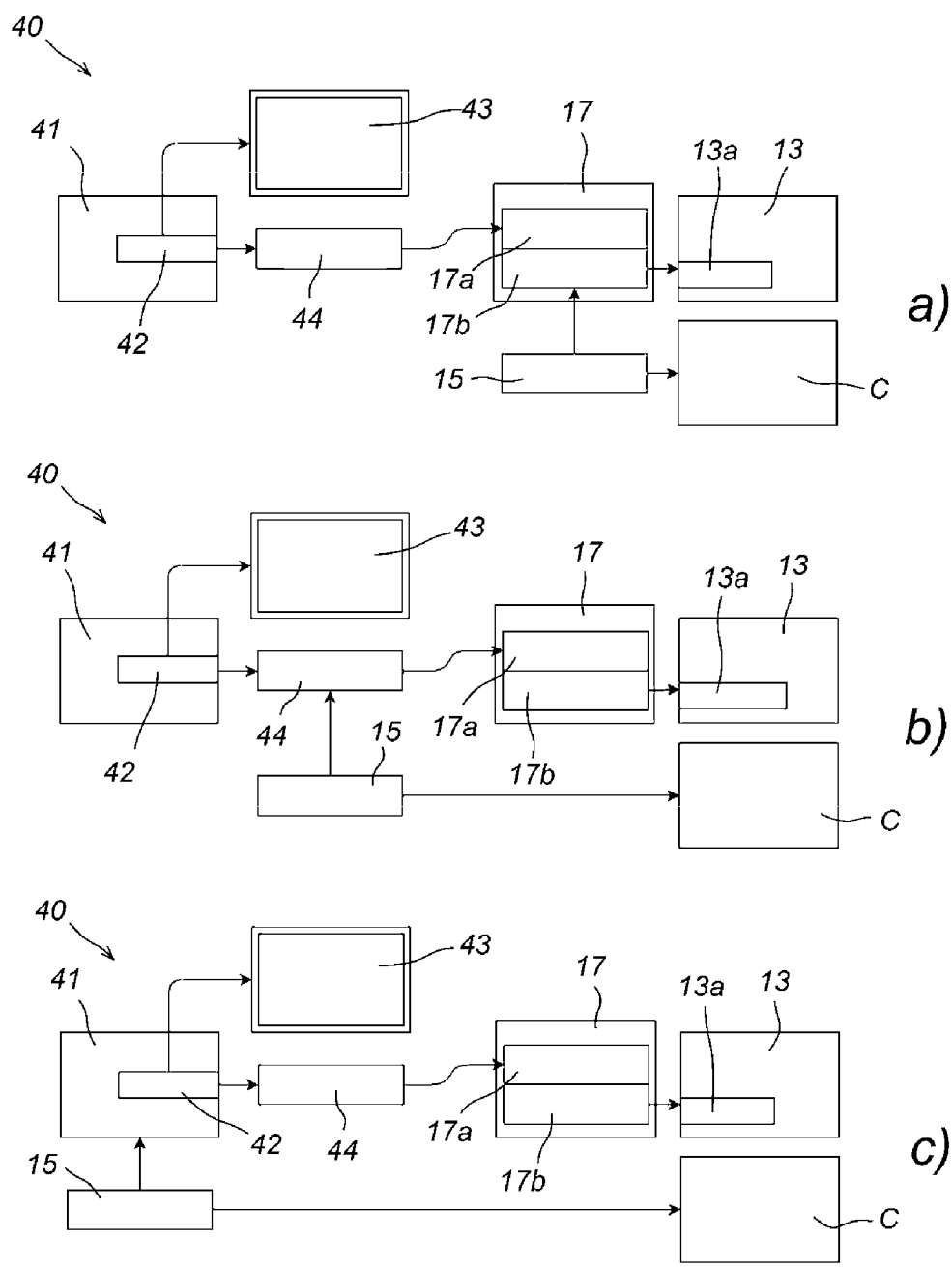
FIG. 7 shows three alternative embodiments for implementing the synchronization of physical display and cameras in the method of the present invention.

FIG. 7 depicts three alternative methods for implementing the synchronization of physical display and one or more cameras in the method of the present invention. In the embodiments shown in FIGS. 7a, 7b and 7c, several elements already depicted in the schematic views of FIGS. 1 and 4 are shown again: The embodiments of FIG. 7 show an LED display 13 and a camera C (representing one or more cameras) for reporting a scheme which includes the LED display 13. As also shown in FIGS. 1 and 4, respectively, an interface 17 is provided which receives image data to be shown on LED display 13 via data line 31. In the embodiment of FIG. 7, image data are provided by a computer unit 40 which may, for instance, include a processing and storage component 41 which can comprise one or more graphic cards 42 and one or more control displays 43. The computer unit 40 also comprises a dedicated sending card 44 which receives image information from the graphic card(s) of the processing and storage component 41 and transmits the image data to a corresponding receiving card 17a of the interface 17. The interface 17 further comprises Field Programmable Gate Arrays (FPGAs) which are configured to send partial image data to associated LED drivers 13a of the LED display 13. Multiple displays or panels 13 form the complete display of an advertisement billboard (reference sign 12 in FIGS. 1 and 4).

The embodiment of FIGS. 7a-7c differ in the manner in which the sequence of image data depicted on the LED display 13 is synchronized with camera C. In the embodiment of FIG. 7a, the master clock 15 triggers the camera C and the FPGAs of the interface 17. It has to be noted, that each FPGA has to be connected to the master clock so that the corresponding wiring is costly and complicated. In the preferred embodiment of FIG. 7b, the trigger signals of master clock 15 are directed to camera C and sending card 44 which then not only transmits image data to the interface 17, but also the corresponding trigger signals to be received by the various FPGAs. Accordingly, the corresponding wiring for clock signals is much simpler. As shown in FIG. 7c, it is also possible to send the master clock signal to the graphic card 42 of the processing and storage component 41 of the computer unit 40. This requires, however, specialized graphic cards which allow transmitting not only image data, but additional trigger information to the sending card.

The concept of including inverse images in the sets of image data displayed on the physical display will be explained in more detail in connection with three embodiments of the method of the present invention shown in FIGS. 8, 9 and 10 respectively.

Figure 8:
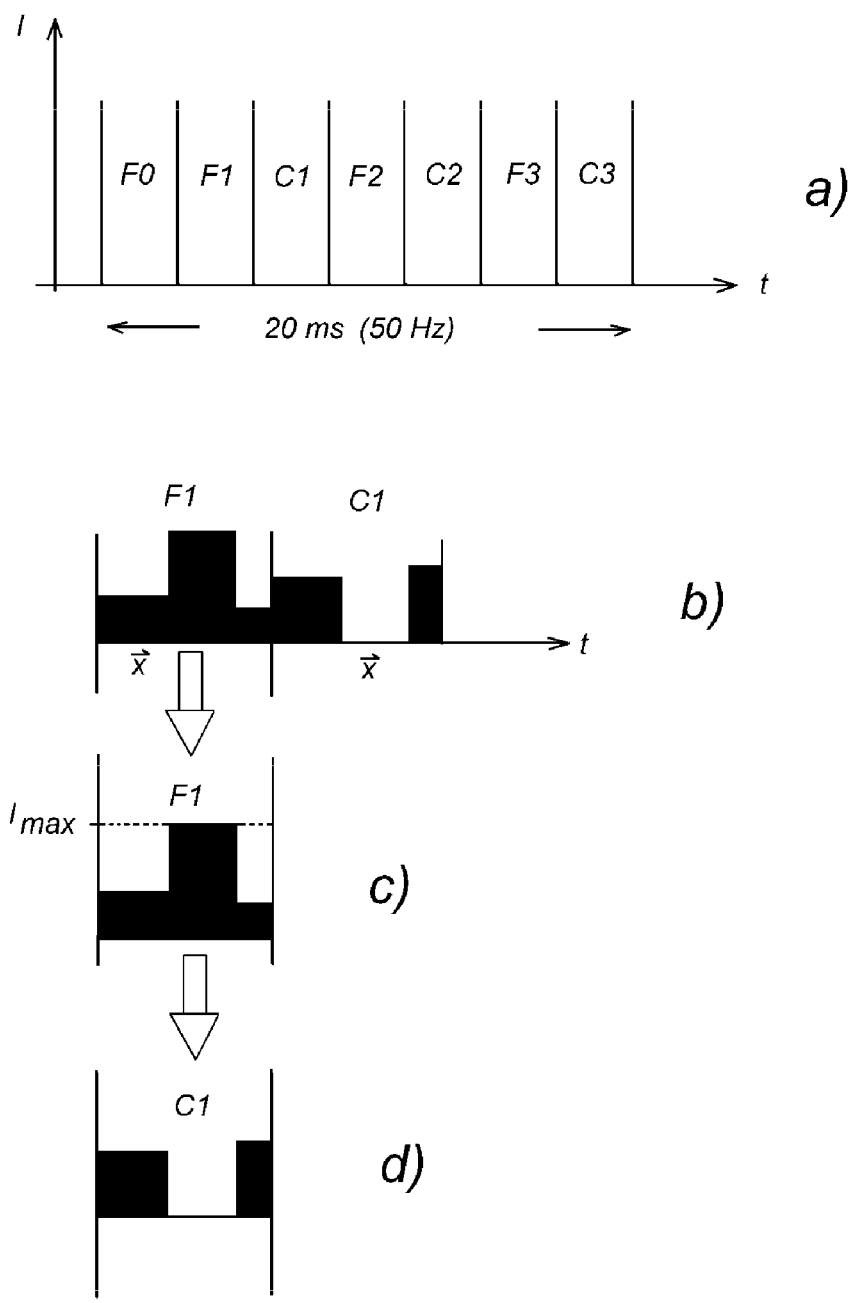
FIG. 8 shows a first embodiment of the present invention using inverse image data.

FIG. 8 shows in FIG. 8a a representation of time slots in which different feeds F0, F1, F2 and F3 (image frames of different sets of image data) are displayed on the physical display in accordance with the method described above. In the present example, the images are displayed with a frame rate of 50 Hz, i.e. each feed comprises images, which are transmitted with said frame rate, accordingly within the time slot of 20 ms, one image of each feed is displayed. Images of feeds 1, 2 and 3 (F1, F2, F3) are intended to be transmitted via a video stream to different sub-sets of broadcast viewers while feed 0 (F0) comprises the images to be consciously viewed by the direct viewer. As a matter of course, in practice one would show the images of direct viewer feed F0 longer and/or brighter than broadcast viewer feeds F1, F2 and F3. Moreover, on order to delimit the effect of feeds F1, F2 and F3 on the images of feed F0 perceived by the direct viewers, the method of the present invention suggests to include inverse/complementary images of feeds F1, F2 and F3, depicted as images C1, C2 and C3. The camera(s) will not record C1, C2 and C3 so that the broadcasted feeds are unaffected but the direct viewer will view a combination of F1 and C2 and F2 and C2 and F3 and C3 which will result in short insertions of grey images.

In accordance with the present invention, inverse images (complementary images) are inserted as described in more detail in connection with FIGS. 8b, 8c and 8d. Accordingly, each feed comprises not only the actual image data, which are captured by a video camera but also corresponding inverse (corrective/complementary) images (C1, C2, C3) which are not intended to be captured by the video camera but will be viewed by the direct viewers only. This is exemplified in FIG. 8b for an image frame of feed 1 (F1) followed by a corresponding inverse image (C1). As can be taken from FIGS. 4c and 4d, the inverse image (C1) shown in FIG. 4d is calculated on the basis of the transmitted image (F1) shown in FIG. 4c, which is to be filled to a maximum value (Imax).

It should be noted that in FIGS. 8b, c and d, subsequent time slots represent subsequent times but within each time slot spatial intensity variation within the display area are schematically depicted as indicated by a two-dimensional space vector z, although only one dimension is depicted in the present schematic representations.

Figure 9:
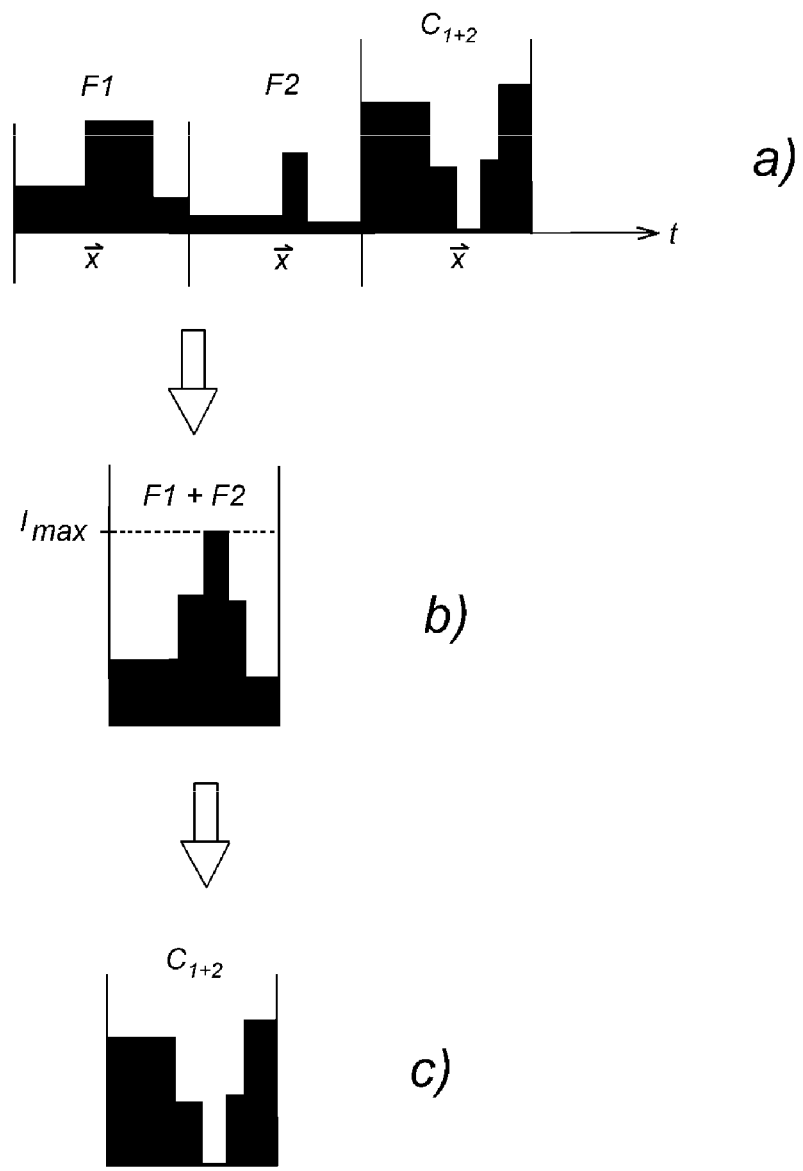
FIG. 9 shows a second embodiment of the present invention using inverse image data.

FIG. 9 shows a second embodiment of the method of the present invention using inverse image data where the inverse images are calculated on the basis of image data of more than one feed. In the example of FIG. 9, feeds 1 and 2 (F1, F2) are combined and a corresponding inverse image is generated by adding feeds 1 and 2 and calculating the inverse image $C_{1+2}$ on the basis of the required difference to obtain a homogeneous maximum intensity value (FIG. 9a). In the example, a sum-images of feeds F1 and F2 is created and the maximum intensity value $I_{max}$ is determined (FIG. 9b). From this combined sum-image, the inverse/complementary image $C_{1+2}$ is calculated (FIG. 9c).

Figure 10:
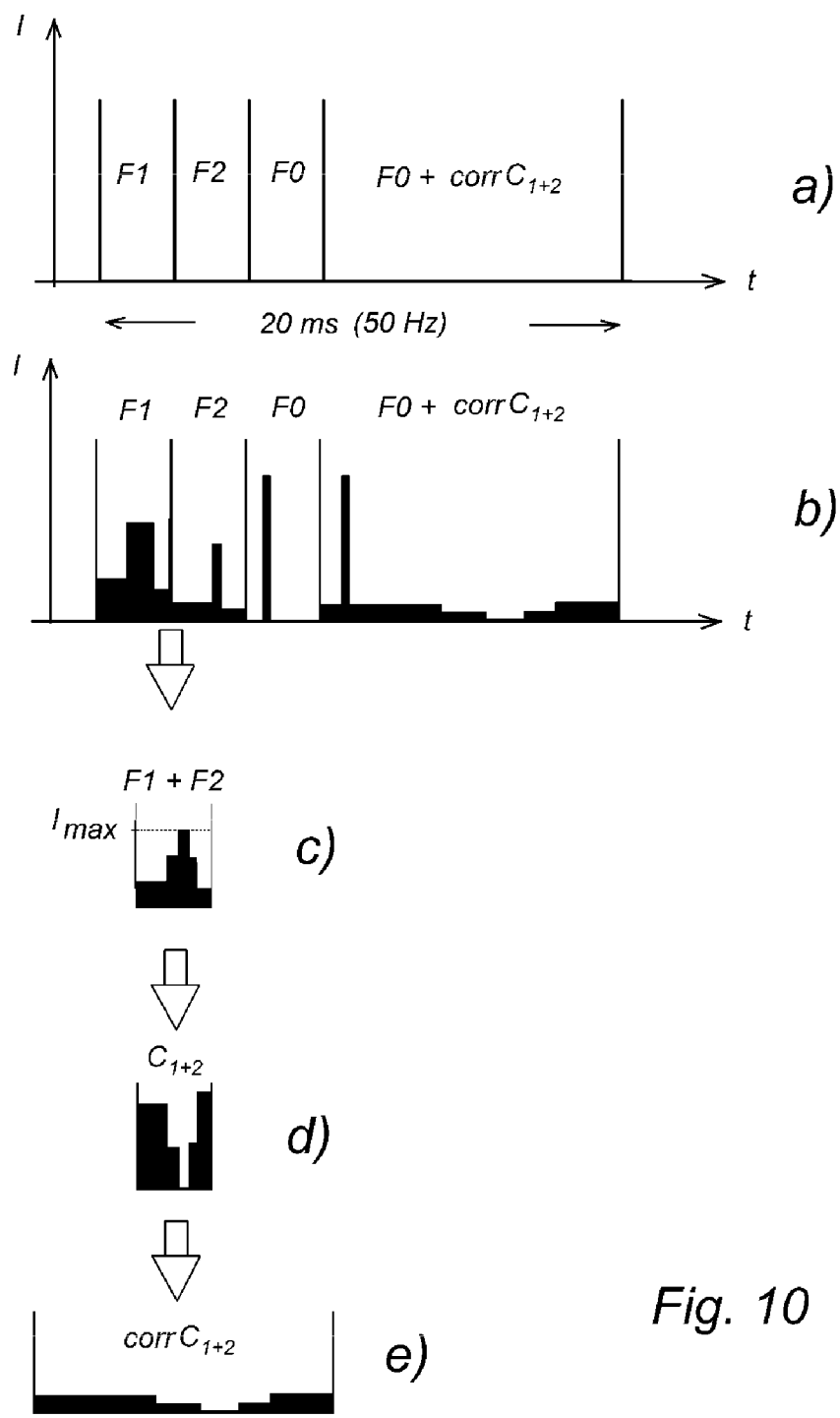
FIG. 10 shows a third embodiment of the method of the present invention using inverse image data.

FIG. 10 shows an embodiment, where the inverse image is displayed together with the images of the set of image data intended for the direct viewers (feed F0). Accordingly, as can be taken from FIG. 10a, the inverse image corrC1+2 can be displayed for a prolonged period of time allowing to use lower intensities for the inverse images. As can be taken from FIGS. 10a and 10b, in this embodiment, feed F0 is also transmitted without corrective image data corrC1+2 thus allowing the image data viewed by the direct viewers to be also transmitted to video viewers in an undisturbed video channel. This undisturbed feed F0 is not required when the image data seen by the direct viewers does not have to be transmitted via a video stream.

As can be taken from FIGS. 10c, 10d and 10e, the combined corrective inverse image data for feeds F1 and F2, i.e. the image data which shall not be perceived by the direct viewers, are initially calculated similar to the embodiment of FIG. 9, i.e. the sum of both feeds F1+F2 is calculated (FIG. 10c) and the inverse image $C_{1+2}$ can be derived as the difference to the maximum intensity $I_{max}$ (FIG. 10d). As $C_{1+2}$ is displayed over a prolonged period of time, $C_{1+2}$ is divided by the time period and the current intensity employed to transmit the inverse image so that the resulting intensities can be lower for the corrective image data corr$C_{1+2}$ (FIG. 10e). The actual image data transmitted in the fourth time slot in the representations of FIGS. 10a-10e is a signal obtained by adding the image data of feed F0 to the weighted image data (FIG. 10e) of the inverse image data of FIG. 10d.

Figure 11:
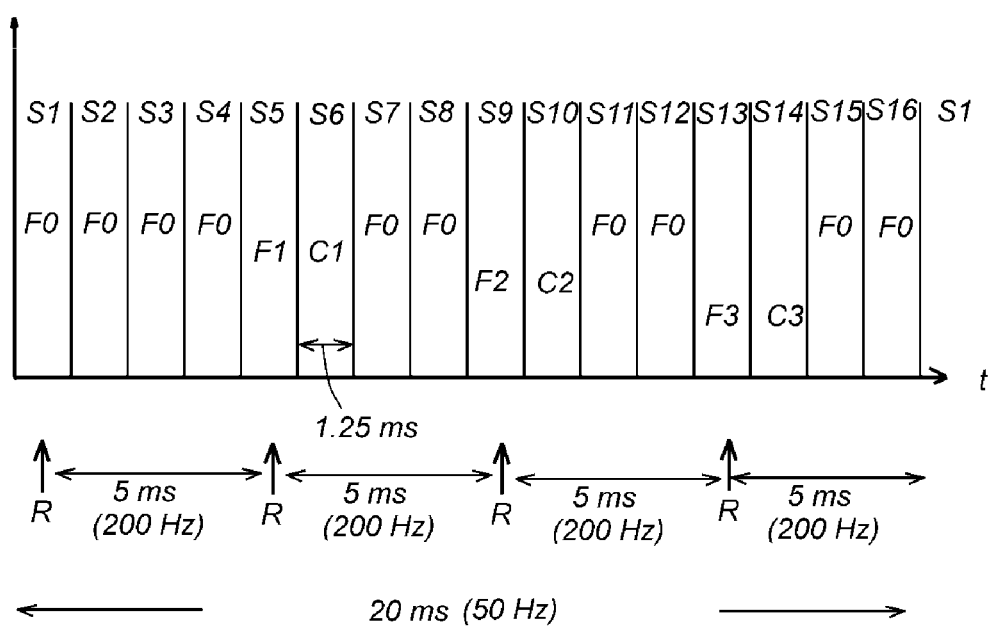
FIG. 11 shows an improvement for reducing flicker on the physical display.

FIG. 11 shows an improved scheme for presenting image data and inverse image data in a manner which reduces flicker for the direct viewers to a minimum.

The embodiment of FIG. 11 is based on the assumption that the normal frame rate of video screens transmitted with the method of the present invention corresponds to 50 Hz. In this embodiment, four different sets of image data are employed: One set of image data (feed F0) is intended to be consciously viewed by the direct viewers. Three additional feeds (F1, F2, F3) are intended to be consciously viewed by broadcast viewers only. In the depicted embodiment, the image data of feed F0 are also transmitted to a sub-set of broadcast viewers. Accordingly, a camera (or cameras) allowing to capture video at a frame rate of 200 Hz are employed, so that four different frames (one image frame for each video screen to be transmitted) can be captured by the camera within the time period of 20 ms of the 50 Hz standard frame rate.

In order to reduce influence on of the perception of feed F0 by the direct viewers to a minimum, it is suggested by the present invention that each frame intended to be viewed by broadcast viewers only is followed by a frame depicting an inverse image, generated for instance as described in connection with FIG. 8. Still, however, a frame rate of 50 Hz, the feed F0 intended to be consciously viewed by the direct viewers, is still prone to flickering.

The embodiment of the method of the present invention depicted in FIG. 11 allows to minimize flickering of the images presented to the direct viewers by increasing the perceived frame rate of images of the set of images of feed F0 presented to the direct viewers. As shown, each frame of image data for the direct viewers is shown in multiple times flood before end or after each frame of image data for the broadcast viewers. In the embodiment of FIG. 11, the time period of 20 ms of the standard frame rate 50 Hz is subdivided into 16 time slots denoted flood S1, S2, S3, S4 . . . , S15 and S16. Accordingly, each time flood has a length of 1.25 ms and 4 time slots make up a period of 5 ms, i.e. the 200 Hz frame rate of the camera employed in the embodiment. Accordingly, the image data of feed F0 intended to be consciously viewed by the direct viewers is presented in time slots S1, S2, S3, S4. Time slot S1 is likewise the third time slot recorded by the camera. The time slots in which camera recording is active are denoted by symbol "R" in FIG. 11. In time slot S5, an image frame of feed F1 intended for the broadcast viewers only is depicted on the physical display 13 and is also recorded by the camera (see symbol "R"). Time slot S6 shows the complimentary/inverse image C1 of the image of feed F1 and is not recorded by the camera. However, for the direct viewers, the rapid combination of frames F1 and C1 results in a hardly perceivable grey image which does not disturb the perception of the main feed F0 intended for the direct viewers. Now, in slots S7 and S8, two frames of feed F0 are presented again before image data F2 and complimentary image data C2 are presented in Slots S9 and S10. Slots S11 and S12 again depict image data of feed F0 while slots S13 and S14 show image data F3 and complimentary image data C3 of the third feed for broadcast viewers. Slots S15 and S16 are then again dedicated to feed F0 for the broadcast viewers.

Accordingly, the image data of feed F0 intended to be viewed by the direct viewers are presented at a higher frame rate, thus minimizing any flickering.

It is of further advantage if the intensities of image data presented to the direct viewers (F0) are higher than the intensities of the images presented to the broadcast viewers (F1, F2, F3) in order to reduce the minimum intensity shown on the physical display 13 to a dark grey/almost black value (assuming that the sensitivity of the cameras employed is sufficiently high). This will also reduce any distortion of the perception for the direct viewers even more. In such an embodiment, it is also possible to reduce the intensities of the image presented in slot S1 to the same level as the intensities of the images intended for the broadcast viewers, so that no special camera adaption is required for the video stream based on feed F0. The reduction of the intensity in one slot out of 10 slots having image data for the direct viewers still does not noticeably affect the overall intensity perceived by the direct viewers.

As a matter of course, similar schemes can be devised for different standard frame rates such as 25 Hz or 60 Hz.

The invention claimed is:

1. A method for transmitting alternative image content of a physical display to different sub-sets of viewers, one sub-set of viewers comprising direct viewers watching image content on said physical display directly with human eyes, at least one other sub-set of viewers comprising broadcast viewers watching a video stream of a scene which includes said physical display, said method comprising:
generating at least two different sets of image data, namely a first set of image data comprising a sequence of first images to be perceived by said direct viewers, and at least a second set of image data comprising a sequence of second images to be perceived by said broadcast viewers and not to be perceived by said direct viewers, wherein, in order to reduce flickering of perception of said first set of image data by said direct viewers, said at least second set of image data comprises a sequence of said second images and corresponding inverse images;
displaying the images of said at least two sets of image data in a time-sliced multiplexed manner on said physical display, wherein in order to reduce flickering of the perception of said first set of image data by said direct viewers, said at least second set of image data comprises a sequence of said second images and corresponding inverse images;
generating at least one video stream of a scene which includes said physical display, said video stream consisting of video frames captured with a frame rate higher than 20 Hz synchronously with the displaying of the images of one of said at least two sets of image data on said physical display, wherein said video stream does not include inverse images; and
transmitting said video stream to said broadcast viewers.

2. The method of claim 1, wherein the inverse image of each preceding and/or subsequent image of a set of image data is generated such that the combined image and inverse image result in a perceived image having a homogenous intensity and/or a homogeneous grey value.

3. The method of claim 1, wherein the inverse image of preceding and/or subsequent images of more than one set of image data is generated such that the combined images of said more than one set of image data and the corresponding inverse image result in a perceived image having a homogenous intensity and/or a homogeneous grey value.

4. The method of claim 1, wherein said inverse image is generated by including image data from said set of image data to be viewed by said direct viewers directly on said physical display.

5. The method of claim 1, wherein at least one of said at least two sets of different image data comprises a set of monochromatic image data.

6. The method of claim 5, wherein at least one sub-set of said inverse images is generated on the basis of said set of monochromatic image data.

7. The method of claim 1, wherein the set of image data for the direct viewers is displayed at a higher frequency on said physical display than the set (or each of the sets) of image data for the broadcast viewers.

8. The method of claim 7, wherein each frame of image data for the direct viewers is shown in multiple time slots before and/or after each frame of image data for the broadcast viewers.

9. The method of claim 1, wherein a video stream is generated for each set of image data displayed on said physical display.

10. The method of claim 1, comprising generating synchronization signals triggering the concurrent displaying of images of said at least one set of image data on said physical display and capturing of video frames of the video stream associated to said set of image data.

11. The method of claim 10, wherein said synchronization signals are based on a master clock corresponding to the frame rate of said video stream.

12. The method of claim 11, wherein said synchronization signals comprise slave clocks obtained by shifting said master clock by a specific delay for each video stream.

13. The method of claim 1, wherein the physical display is a LED display.

14. The method of claim 13, wherein the LED display is a signboard or billboard and said scene is part of a sports event or an entertainment event.

15. A control interface for displaying at least first and second sets of image data on a physical display in a time-sliced multiplexed manner to different sub-sets of viewers, one sub-set of viewers comprising direct viewers watching image content on said physical display directly with human eyes and at least one other sub-set of viewers comprising broadcast viewers watching a video stream of a scene which includes said physical display, comprising means for receiving or generating a master clock signal, means for generating two or more time-shifted slave clock signals and means for generating trigger signals in correspondence with said two or more time-shifted slave clock signals, said control interface being configured to:
generate at least two different sets of image data, namely a first set of image data comprising a sequence of first images to be perceived by said direct viewers, and at least a second set of image data comprising a sequence of second images to be perceived by said broadcast viewers and not to be perceived by said direct viewers, wherein, in order to reduce flickering of the perception of said first set of image data by said direct viewers, said at least second set of image data comprises a sequence of said second images and corresponding inverse images;
display the images of said at least two sets of image data in a time-sliced multiplexed manner on said physical display, wherein in order to reduce flickering of the perception of said first set of image data by said direct viewers, said at least second set of image data comprises a sequence of said second images and corresponding inverse images.

16. The control interface of claim 15, further comprising at least one input receiving an external master clock signal, at least two slave outputs for transmitting said slave clock signals to two or more cameras and at least one trigger outputs for transmitting trigger signals to a physical display for displaying different sets of image data on said physical display in a time-sliced multiplexed manner.

17. The control interface of claim 15, wherein said means for receiving or generating a master clock signal, means for generating two or more time-shifted slave clock signals and means for generating trigger signals in correspondence with said two or more time-shifted slave clock signals are at least partly hardware-implemented in dedicated micro-controllers.

18. The control interface of claim 15, wherein said means for receiving or generating a master clock signal, means for generating two or more time-shifted slave clock signals and means for generating trigger signals in correspondence with said two or more time-shifted slave clock signals are at implemented as an executable program in a general purpose computer.

19. A system for transmitting alternative image content of a physical display to different viewers, comprising:
   at least one physical display;
   a control interface for displaying at least first and second sets of image data on a physical display in a time-sliced multiplexed manner to different sub-sets of viewers, one sub-set of viewers comprising direct viewers watching image content on said physical display directly with human eyes and at least one other sub-set of viewers comprising broadcast viewers watching a video stream of a scene which includes said physical display, comprising
   means for receiving or generating a master clock signal,
   means for generating two or more time-shifted slave clock signals
   and means for generating trigger signals in correspondence with said two or more time-shifted slave clock signals,
   said control interface being configured to:
   generate at least two different sets of image data, namely a first set of image data comprising a sequence of first images to be perceived by said direct viewers, and at least a second set of image data comprising a sequence of second images to be perceived by said broadcast viewers and not to be perceived by said direct viewers, wherein, in order to reduce flickering of the perception of said first set of image data by said direct viewers, said at least second set of image data comprises a sequence of said second images and corresponding inverse images;
   display the images of said at least two sets of image data in a time-sliced multiplexed manner on said physical display, wherein in order to reduce flickering of the perception of said first set of image data by said direct viewers, said at least second set of image data comprises a sequence of said second images and corresponding inverse images;
   at least one camera for recoding a scene including said physical display in correspondence with at least one of said at least first and second sets of image data,
   means for generating at least one video stream from video data provided by said at least one camera; and
   means for transmitting said video stream to a sub-set of said viewers.

20. A method for transmitting alternative image content of a physical display to different sub-sets of viewers, one sub-set of viewers comprising direct viewers watching image content on said physical display directly with human eyes and at least one other sub-set of viewers comprising broadcast viewers watching a video stream of a scene which includes said physical display, said method comprising:
   generating at least two different sets of image data, namely a first set of image data comprising a sequence of first images to be perceived by said direct viewers, and at least a second set of image data comprising a sequence of second images to be perceived by said broadcast viewers and not to be perceived by said direct viewers, wherein, in order to reduce flickering of the perception of said first set of image data by said direct viewers, said at least second set of image data comprises a sequence of said second images and corresponding inverse images;
   displaying the images of said at least two sets of image data in a time-sliced multiplexed manner on said physical display, wherein in order to reduce flickering of the perception of said first set of image data by said direct viewers, said at least second set of image data comprises a sequence of said second images and corresponding inverse images, and wherein each image of said sequence of first images is displayed at least once at a higher intensity than said sequence of second images and at least once at the same intensity as said sequence of second images;
   generating at least two video streams of a scene which includes said physical display, said video streams consisting of video frames captured with a frame rate higher than 20 Hz synchronously with the displaying of the images of two of said at least two sets of image data on said physical display, wherein said video streams do not include inverse images, wherein a first video stream is generated from said images of said sequence of first images having the same intensity as said sequence of second images and a second video stream is generated from said images of said sequence of second images; and
   transmitting said video streams to said broadcast viewers.

* * * * *